March 13, 1956
R. L. WOLD
2,737,778
SLIDING SCOOP
Filed May 10, 1954
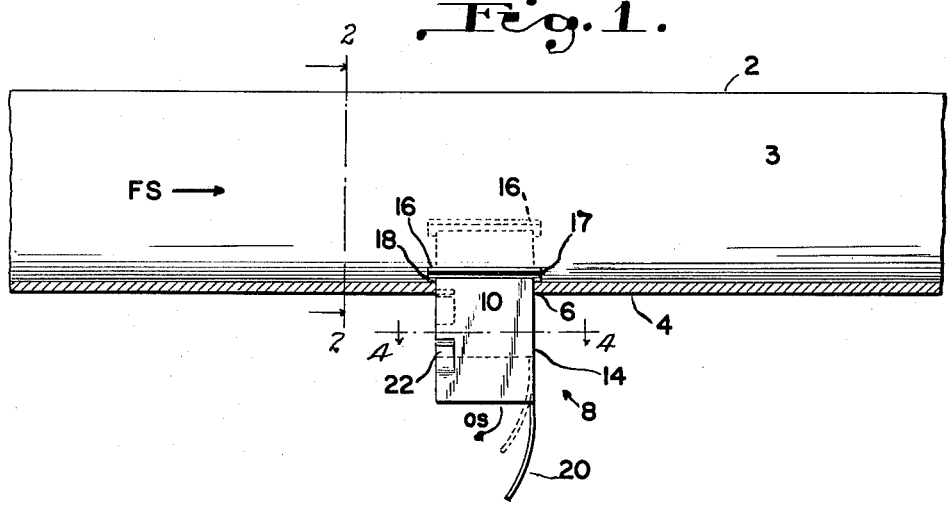
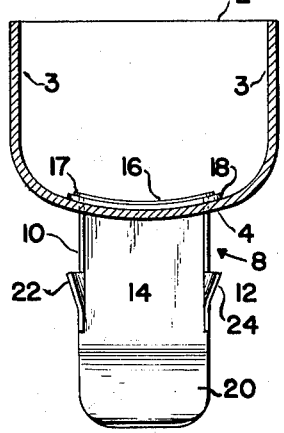
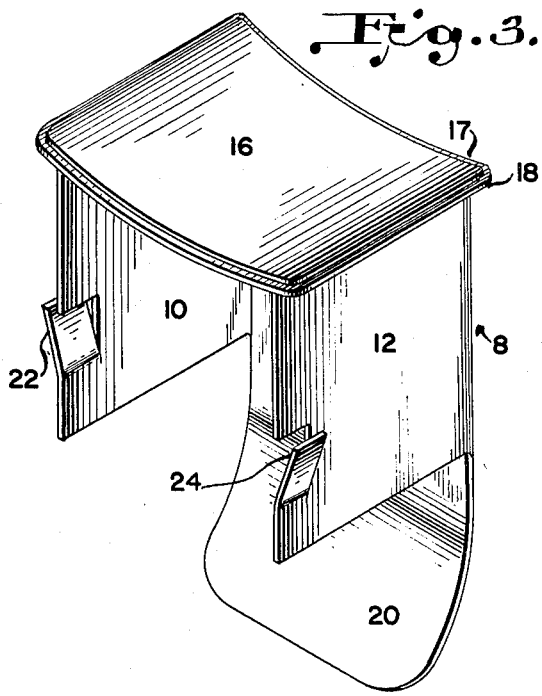
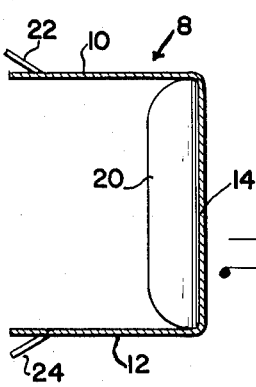
INVENTOR
Russell L. Wold
BY James H. Littlepage
ATTORNEY

United States Patent Office 2,737,778
Patented Mar. 13, 1956

2,737,778
SLIDING SCOOP

Russell L. Wold, Lihue, Kauai, Territory of Hawaii

Application May 10, 1954, Serial No. 428,512

8 Claims. (Cl. 61—15)

This invention relates to irrigation apparatus and, more particularly, to a flume scoop for discharging irrigation water through the bottom of a flume.

The object of the invention is to provide a scoop particularly adapted for flume systems where the grade of the flume is less than ten percent. For such installations, where the flume stream runs comparatively slowly, it is intended now to provide a scoop which remains in the flume, and which is capable of closing an outlet in the flume bottom so that no water will flow outwardly through the opening, and capable also of adjustment to a selected open position to provide an outflow up to 150 gallons per minute or more.

A more particular object of the invention is to provide a scoop slidably adjustable in an outlet opening in a flume to close the opening or to provide a predetermined outflow and which scoop, in its open positions, swirls the water so as to dissipate the force of the outflowing water and thereby lessen the washing and the erosion of the water on the ground to which outflowing stream is directed. It is especially intended, by this invention, to swirl and direct the outflowing flume water forwardly under the flume, and to utilize the force of the water, just before it leaves the flume scoop for counter-balancing the outlet end of the flume against the force exerted the flume stream on the inner end of the scoop, thereby holding open scoop in correct operating position.

These and other objects will be apparent from the following specification and drawing, in which:

Fig. 1 is a cross section taken lengthwise along a flume showing, in full lines, the scoop in closed position and showing, in dotted lines, the flume in fully open position;

Fig. 2 is a cross section along the line 2—2 of Fig. 1;

Fig. 3 is a perspective view showing the scoop removed from the flume; and,

Fig. 4 is a cross section along the line 4—4 of Fig. 1.

Referring now to the drawing in which like reference numerals denote similar elements, flume 2 is of conventional construction in that it has side walls 3, an open top, and a slightly curved bottom wall 4. However, bottom wall 4 has a generally rectangular outlet 6 through which, but for the flume scoop denoted generally at 8, water would flow directly downwardly and outwardly.

Scoop 8, preferably formed of sheet metal, has spaced parallel side walls 10 and 12 respectively, a rear wall 14 connected between the side walls, and an upwardly concave cap 16 whose edges 17 extend somewhat outwardly of the side and rear walls to which it is joined. As will be apparent from Figs. 1 and 2, the side and rear walls 10, 12 and 14 of the scoop slidingly fit in the rectangular opening 6 in bottom wall 4 of flume 2 while the edges 17 of cap 16 extend outwardly beyond the edges of opening 6. A gasket 18 formed of rubber or the like resilient material is affixed beneath the outwardly projecting edges 17 of cap 16 so that when scoop 8 is pushed downwardly in bottom opening 6, gasket 18 and cap 16 cooperate to seal the opening closed.

Scoop rear wall 14 is longer than side walls 10 and 12 and its lower portion is bent forwardly to provide a curved deflector baffle 20. Side walls 10 and 12 are respectively cut to provide stops 22 and 24 bent outwardly so that their upper edges engage against flume bottom wall 4 when scoop 8 is pulled upwardly in its fully open position as shown in dotted lines in Fig. 1.

In operation, scoop 8 is installed in the position shown in Fig. 1, it being assumed that flume 2 inclines downwardly from left to right along a gentle slope and that the flume stream runs from left to right as indicated by the arrow FS in Fig. 1. In the full line position of scoop 8, cap 16 holds gasket 18 against the inner side of the flume bottom so as to seal outlet opening 6. When water is to be emitted from the flume, scoop 8 is pulled upwardly toward the dotted line position of Fig. 1, this operation preferably being accomplished by manipulation of a stick with a vacuum cup on its end. Scoop 8 may be opened by upward sliding to any desired extent up to the position shown in dotted lines in Fig. 1 and in its fully open position, stops 22 and 24 engage against the flume bottom. When open, the portion of the flume stream caught by scoop 8 is directed downwardly and swirled forwardly as indicated by the curved arrow OS. When the scoop is disposed to open the outlet 6, the force of the flume stream applied against the portion of the scoop which extends inwardly of the flume would normally tend to tip the upper inner portion of the scoop rearwardly, with the downstream edge of flume opening 6 acting as a fulcrum. However, the force of the outlet stream against the forwardly curved deflector baffle 20 is slightly greater than the force of the flume stream applied against the capped end of the scoop so that the scoop, if it tips at all, tips slightly downwardly and forwardly in the flume. By this arrangement it is possible to predetermine the maximum flow of the outlet stream so that any surges in the flume stream cannot open the scoop and thereby create a larger outlet stream than the desired maximum. When irrigation at that point is to be stopped, scoop 8 is pushed downwardly to its full line position.

The invention is not limited precisely to the structure hereinbefore detailed, but is intended to cover all modifications, substitutions and equivalents within the scope of the following claims.

I claim:

1. In a combination; a flume having an outlet through a wall thereof, a scoop having a pair of spaced sidewalls connected by a rear wall and having an open front, a cap connected to said side and rear walls at one end of the scoop, said cap having edges extending outwardly beyond the front, rear and sides of said scoop, said walls slidingly engaging in said flume outlet with the capped end thereof inside the flume, whereby said flume opening may be closed or opened respectively by sliding said scoop walls in said outlet so as to dispose the cap against or inwardly away from the edges of the material surrounding the flume outlet, said rear wall having the end thereof remote from the cap curved towards the open front of the scoop, whereby when the outlet is open, the curved end swirls the outlet stream forwardly and the force of the outlet stream thereagainst counterbalances the force of the flume stream against the capped end of the scoop.

2. The combination claimed in claim 1, said outlet being rectangular, said side and rear walls of said scoop constituting three sides of a rectangle slightly smaller than the rectangular outlet.

3. The combination claimed in claim 1, said flume having an upwardly concave bottom, said outlet being through said bottom, said cap being upwardly of concave sheet material.

4. The combination claimed in claim 1, and stops on said side walls, said stops engaging against the flume exterior when said scoop is in position to open said outlet to a predetermined maximum.

5. A device for controlling the outflow of water through a rectangular outlet in a flume, comprising; a scoop having a pair of spaced sidewalls connected by a rear wall and having an open front, a cap connected to said side and rear walls at one end of the scoop, said cap having edges extending outwardly beyond the front, rear and sides of said scoop, said walls defining three sides of a rectangle and being adapted to fit within the outlet to be controlled and being adapted to slidingly engage in the flume outlet with the capped end thereof inside the flume, whereby said flume opening may be closed or opened respectively by sliding said scoop walls in said outlet so as to dispose the cap against or inwardly away from the edges of the flume surrounding the flume outlet, and stop means projecting outwardly from at least one of said walls intermediate the upper and lower end thereof, said stop means being adapted to engage the flume for limiting the sliding open movement of said scoop in the flume opening.

6. The combination claimed in claim 5 and a resilient gasket disposed beneath the edges of said cap for sealing said outlet closed.

7. A device for controlling the outflow of water through an outlet in a flume, comprising; a scoop having a pair of spaced sidewalls connected by a rear wall and having an open front, a cap connected to said side and rear walls at one end of the scoop, said cap having edges extending outwardly beyond the front, rear and sides of said scoop, said walls being adapted to slidingly engage in said flume outlet with the capped end thereof inside the flume, whereby said flume opening may be closed or opened respectively by sliding said scoop walls in said outlet so as to dispose the cap against or inwardly away from the edges of the flume surrounding the flume outlet, said rear wall having the end thereof remote from the cap curved towards the open front of the scoop, whereby when the outlet is open, the curved end swirls the outlet stream forwardly and the force of the outlet stream thereagainst counterbalances the force of the flume stream against the capped end of the scoop.

8. A device for controlling the outflow of water through an outlet in a flume, comprising; a scoop having a pair of spaced sidewalls connected by a rear wall and having an open front, a cap connected to said side and rear walls at one end of the scoop, said cap having edges extending outwardly beyond the front, rear and sides of said scoop, said walls being adapted to slidingly engage in said flume outlet with the capped end thereof inside the flume, whereby said flume opening may be closed or opened respectively by sliding said scoop walls in said outlet so as to dispose the cap against or inwardly away from the edges of the flume surrounding the flume outlet, the end of the rear wall remote from the cap extending substantially beyond the corresponding ends of the side walls and curving towards the open front of the scoop, whereby when the outlet is open, the curved end swirls the outlet stream forwardly and the force of the outlet stream thereagainst counterbalances the force of the flume stream against the capped end of the scoop.

References Cited in the file of this patent

UNITED STATES PATENTS

| | | |
|---|---|---|
| 2,003,730 | Baldwin | June 4, 1935 |
| 2,101,234 | Becher | Dec. 7, 1937 |
| 2,656,682 | Wold | Oct. 27, 1953 |